Feb. 28, 1956  E. J. BRUSELL  2,736,233
MULTIFOCAL INSERTS FOR OPHTHALMIC LENSES
Filed Feb. 6, 1950

INVENTOR
Ernest J. Brusell
BY Robert M. Dunning
ATTORNEY

United States Patent Office 2,736,233
Patented Feb. 28, 1956

2,736,233

MULTIFOCAL INSERTS FOR OPHTHALMIC LENSES

Ernest J. Brusell, St. Paul, Minn.

Application February 6, 1950, Serial No. 142,665

5 Claims. (Cl. 88—54)

My invention relates to an improvement in multifocal ophthalmic lenses wherein it is desired to provide eyeglasses having multifocal lenses providing an unusual amount of useable area.

Some forms of trifocal lenses are made by employing a reading segment and an intermediate vision segment which join one another along a generally horizontal line. As a result the intermediate vision segment is usually provided with horizontally extending generally parallel upper and lower edges. I have found that much more useable area may be obtained without increasing the size of the intermediate vision segment by connecting the segments by a line extending outwardly and downwardly from the nasal side of the lens insert to the temporal side thereof.

An object of the present invention lies in the provision of a trifocal lens in which the line of connection between the reading segment and the intermediate vision segment inclines downwardly and outwardly from the center of the pair of lenses as mounted in a spectacle frame. The intermediate vision segment is uppermost and is used in viewing objects at substantially arms length in most instances. The reading segment is beneath the intermediate vision segment in the insert and is ordinarily used in viewing objects at a somewhat shorter focal distance. The line of connection between the two segments slants downwardly and outwardly from a center line between the two lenses.

A feature of the present invention lies in the provision of a near vision or reading segment which is relatively deep near the inner or nasal edge of the lens insert and is relatively shallow near the outer or temporal edge thereof. The intermediate vision segment is preferably relatively shallow near the inner or nasal edge of the lens insert and relatively deep near the outer or temporal edge thereof. By thus arranging the segments better vision may be obtained at both focal distances without increasing the area of the insert.

A feature of the present invention lies in the provision of reading segments which are of greatest depth near their inner edges, because the eyes focus inwardly while viewing an object at relatively close range. As the eyes turn inwardly to focus upon an object at close range, the line of vision ordinarily extends through the inner portion of each lens and thus will pass through the inner edges of the reading segments which are of greatest depth at this point. It is usual to focus the eyes upon an object close at hand only when the object is directly in front of the eyes. Therefore, the fact that the outer edges of the reading segments are of lesser depth, is not important.

A further feature of the present invention lies in the fact that the intermediate vision segments are of greatest depth nearest their outer or temporal edges. As the eyes are focused upon an object located at arms length, the lines of vision from the eyes extend more nearly parallel. Therefore the inner or nasal edges of the intermediate vision segments may be reduced in depth without losing any appreciable amount of the field of vision through these segments. By inclining the line of connection between the two segments in the manner described, the effective field of vision through each of the segments is appreciably increased without increasing the area of the lens insert.

A further feature of the present invention lies in providing a trifocal lens in which the optical center of the intermediate vision segment is above and outwardly of the optical center of the reading segment. As a result, while looking at an object forwardly of the lenses through either of the segments, the line of vision extends substantially through the optical center of each segment.

These and other objects and novel features of my invention will be more clearly and fully set forth in the following specification and claims.

In the drawings forming a part of my specification:

Figure 1:
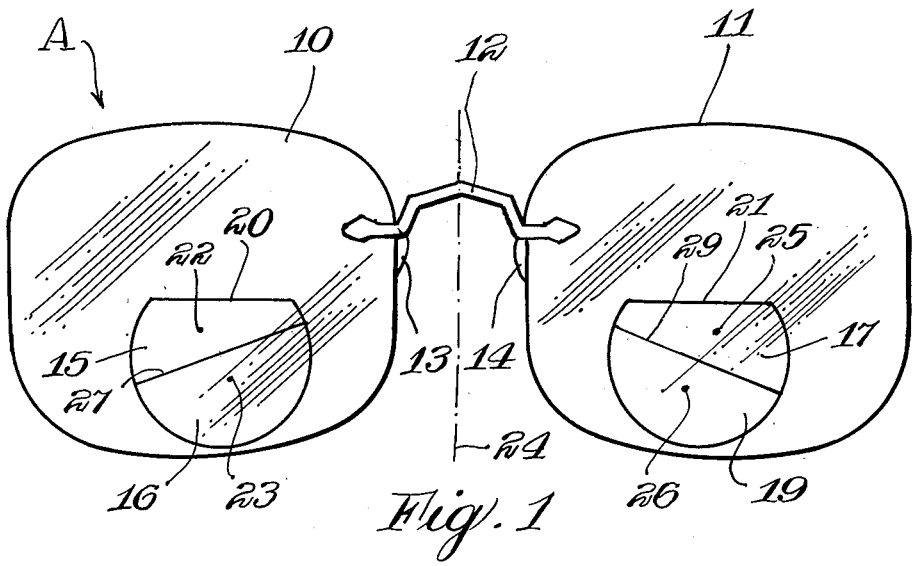
Figure 1 is a front elevational view of a pair of glasses showing my multifocal inserts therein.

The eyeglasses A may be of any suitable shape or design and may be held in place in any suitable manner. The eyeglasses A are shown as including lenses 10 and 11 connected by a bridge 12. Means are normally provided for attaching the lenses 10 and 11 in place, these means not being illustrated in the drawings as they form no part of the present invention. Nose pads such as 13 and 14 may be provided so that the lenses may rest easily over the bridge of the nose.

The lens 10 is provided with an intermediate vision segment 15 and a reading or near vision segment 16. The segment 15 may be of proper strength to provide best vision at substantially arms length and may for example be found to provide best vision at twenty-six inches distance. The reading segment 16 is arranged to provide best vision at a shorter focal distance, as for example sixteen inches. The lens 11 is provided with an intermediate vision segment 17 and a reading or near vision segment 19. These segments are shaped similarly to the segments 15 and 16, but are reversely arranged.

The combined segments 15 and 16 provide an area which is substantially circular in form with a portion of the top of the circle cut off along a substantially horizontal line 20. The combined segments 17 and 19 are also shown circular in form with a small portion of the circle cut off along the upper edge 21. The outline of the combined segments may be varied somewhat without changing the spirit of the invention.

If so desired, the trifocal lenses 10 and 11 may be constructed with the optical centers of the intermediate vision segments disposed above and outwardly of the optical centers of the reading segments.

The optical center of the intermediate vision segment 15 is indicated at the point 22. The optical center of the reading segment 16 is indicated by the numeral 23. It will be noted that the point 22 is above the level of the point 23 and is located at a greater distance from the center line 24 between the lenses 10 and 11. The optical center of the intermediated vision segment 17 is indicated by the numeral 25, while the optical center of the reading segment 19 is indicated at 26. The point 25 is above the level of the point 26 and at a greater distance from the center line 24.

The segments 15 and 16 are connected along a downwardly and outwardly inclined line of connection 27. As a result the intermediate vision segment 15 is somewhat triangular in form, being of minimum vertical depth at the nasal side thereof and being of maximum depth at the temporal side thereof. The reading segment 16 is so arranged as to be of maximum vertical depth at the nasal side thereof and of minimum depth at the temporal side thereof.

The segments 17 and 19 are shown connected along a line of connection 29 which inclines downwardly and outwardly from the nasal side of the lens insert to the temporal side thereof. As a result the intermediate vision segment 17 is of minimum vertical depth at the nasal side thereof and is of maximum depth at the temporal side thereof. Similarly the reading segment 19 is of maximum depth at the nasal side of the segment and of minimum depth at the temporal side thereof.

When the glasses are properly adjusted and are arranged the proper distance apart, the multifocal inserts are located at substantially the same location as in ordinary trifocal glasses. When viewing an object at close range, for example at a distance of sixteen inches or less from the eyes, the eyes toe inwardly so that the line of vision from the eyes passes through the inner portion of each lens, i. e., through the portion nearest the nosal edge thereof. While thus being directed inwardly, the line of vision tends to pass through the reading segments 16 and 19 at substantially the optical centers 23 and 26 of these segments. If the object being viewed is closer than the focal length of the segments, the lines of vision extend through portions of the segments 16 and 19 inwardly of the points 23 and 26. The reading segments are relatively deep from a vertical standpoint at this part of the segment so that the object may be viewed without interference by the upper or lower edge of the segment. It is usual to view an object close at hand only if this object is almost directly in front of the eyes. Therefore by forming the inner edges of the reading segments of greatest depth, the object may be viewed with the least possible interference.

Figure 2:
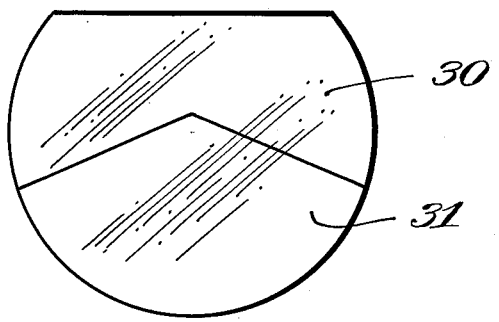
Figure 2 is a diagrammatic representation of the composite binocular field of view obtained when the two eyes look through their respective inserts.

When the eyes are focused upon an object located at arm's length the lines of vision from the eyes are more nearly parallel. Therefore by locating the optical center of the intermediate vision segments outwardly of the optical centers of the reading segments, the line of vision may more nearly extend through the optical center of these segments, while an object is viewed at this distance. When both eyes are looking through their respective intermediate vision segments, the lines of connection 27 and 29 between the reading segments and intermediate vision segments cause the composite binocular field of view to have the appearance and shape illustrated in Figure 2 of the drawings. Greater vertical depth is obtained in the part of the lens through which the line of vision ordinarily extends. When arranged as illustrated, the intermediate vision segments are more shallow vertically at their inner extremities than with intermediate vision segments of the conventional type. However, the line of vision from the eyes normally extends through the optical centers 22 and 25 when looking forwardly at an object and the eyes may be turned a considerable distance without passing through the shallowest portions of these segments. The portions of the intermediate vision segments 15 and 17 through which the line of vision ordinarily extends is relatively deep from a vertical standpoint and at the focal centers of these segments is actually deeper than with intermediate vision segments of the usual type. The composite binocular reading vision field appears to be of the shape indicated by the area 31 in Figure 2 when both lenses are used.

I have found that by arranging the reading and intermediate vision segments in the manner disclosed the effective area of the segments is substantially increased. The line of connection between the two segments is not nearly as visible as under other conditions when the line of connection angles downwardly and outwardly from the inner side of the lens insert to the outer side thereof as described. My arrangement is also desirable for use on lenses without the intermediate vision segments, the reading segments being shaped substantially as illustrated and appearing substantially as pictured with the intermediate vision segments 15 and 17 omitted.

In accordance with the patent statutes, I have described the principles of construction and operation of my multifocal lenses, and while I have endeavored to set forth the best embodiment thereof, I desire to have it understood that these are only illustrative thereof, and that obvious changes may be made within the scope of the following claims without departing from the spirit of my invention.

I claim:

1. Multifocal eyeglasses including a pair of lenses, a two-power insert in each of said lenses, each insert having a reading segment and an intermediate vision segment, said segments being joined along a line inclined at a distinct angle with respect to the horizontal and extending without interruption from the nasal edge to the temporal edge of said insert, and said insert being so formed that said reading segment is of greater vertical depth near its nasal edge than near its temporal edge and said intermediate vision segment is of greater vertical depth near its temporal edge than near its nasal edge, thereby providing a near vision field which is of considerable vertical depth when the eyes are fully converged for reading and of diminished vertical depth when the eyes are less converged for more distant vision, and an intermediate vision field which is of inconsiderable vertical depth when the eyes are fully converged for reading and of considerable vertical depth when the eyes are less converged for more distant vision.

2. The eyeglasses of claim 1 in which the upper edge of each two-power insert extends along a substantially horizontal line and the insert is otherwise generally circular.

3. Multifocal eyeglasses including a pair of lenses, a two-power insert in each of said lenses, each insert having a reading segment surmounted by an intermediate vision segment, said segments being joined along a line extending without interruption in a distinctly downwardly and outwardly direction from the nasal edge of said insert to the temporal edge thereof, and said insert being so formed that said reading segment is of greater vertical depth near its nasal edge than near its temporal edge and said intermediate vision segment is of greater vertical depth near its temporal edge than near its nasal edge, thereby providing a near vision field which is of considerabl vertical depth when the eyes are fully converged for reading and of diminished vertical depth when the eyes are less converged for more distant vision, and an intermediate vision field which is of inconsiderable vertical depth when the eyes are fully converged for reading and of considerable vertical depth when the eyes are less converged for more distant vision.

4. The eyeglasses of claim 3 in which the upper edge of each two-power insert extends along a substantially horizontal line and the insert is otherwise generally circular.

5. Multifocal eyeglasses including a pair of lenses, an insert in each of said lenses, said inserts each having nasal, temporal and bottom edges which are defined by the arc of a circle and a top edge which is defined by a substantially horizontal line, and said inserts each including a reading segment located in the bottom portion thereof and an intermediate segment located in the top portion thereof, said segments being adjoined along a line extending without interruption in a distinctly downwardly and outwardly direction from the nasal edge of the insert to the temporal edge thereof, thereby providing a reading segment which is of greater vertical depth near its nasal edge than near its temporal edge, and an intermediate vision segment which is of greater vertical depth near its temporal edge than near its nasal edge.

References Cited in the file of this patent

UNITED STATES PATENTS

| 2,029,480 | Hammon | Feb. 4, 1936 |
| 2,033,573 | Hancock | Mar. 10, 1936 |
| 2,035,846 | Sterling | Mar. 31, 1936 |
| 2,328,584 | Rones | Sept. 7, 1943 |

FOREIGN PATENTS

| 427,736 | Great Britain | Apr. 23, 1935 |
| 435,109 | Great Britain | Sept. 9, 1935 |